Patent 3,717,180 — Flexible Hose

3,717,180
FLEXIBLE HOSE
John Ambrose, New Waltham, and Edmund J. Shepherd, Holton-le-Clay, England, assignors to The Dunlop Company Limited, London, England
Filed Jan. 11, 1971, Ser. No. 105,298
Claims priority, application Great Britain, Jan. 14, 1970, 1,758/70; June 10, 1970, 28,111/70
Int. Cl. F16l 9/14
U.S. Cl. 138—153                5 Claims

ABSTRACT OF THE DISCLOSURE

A process for manufacturing flexible hose in which spaced-apart reinforcement rings are fitted to the hose. The rings are of resinous material and contain reinforcement filaments. The resinous material may be applied in an uncured condition and may be applied into channel-section rings which act as moulds for the reinforcement rings, the resinous material being subsequently cured during vulcanisation of the hose assembly, of which the following is a specification.

---

This invention relates to flexible hose, and in particular to improvements in reinforcements for such hoses. The hose may be of the non-floating or floating type as is used, for example, for the loading of oil to, and from, oil tankers in off-shore loadings and discharge.

Conventional hose of this form particularly when it is of large bore, incorporates a steel reinforcement to provide the necessary strength and crush resistance for the arduous duty in service. The reinforcement is usually applied by helically winding a stout steel wire onto the partially assembled hose but extreme difficulties arise due to the stiffness of the wire and the softness of the uncured hose onto which it is being wound.

Short lengths of hose have been made by sliding solid steel rings onto the hose assembly but again this is difficult and indeed impossible if end fittings of the flanged type are incorporated in the assembly.

According to one aspect of the present invention a process for manufacturing hose comprises forming rings around at least the reinforcing layer for the hose at spaced-apart intervals of uncured resinous material containing reinforcement filaments and subsequently curing the resinous material rings.

Another aspect of the invention provides a process wherein the resinous material is wound into U channel rings positioned around the hose to act as a mould for the resinous material. The resinous material may be mixed with a special catalyst so that curing only occurs at elevated temperature. This ensures curing occurs during the heating to vulcanise the hose assembly.

Yet another aspect of the invention provides a flexible hose comprising an inner lining of elastomeric material, a reinforcement layer or layers of textile or steel wire cord, a plurality of spaced-apart rings of cured resinous material, containing reinforcement filaments, rings of elastomeric filler material between the spaced-apart rings, an outer breaker ply and an outer covering layer.

Still another aspect of the invention provides a buoyant hose. In this arrangement cellular material is placed between the rings and in layers over the rings prior to fitting the outer covering.

The invention also provides a flexible hose line. This is made up of lengths of hose each provided with end fittings which are interconnected to form the pipeline.

Figure 1:
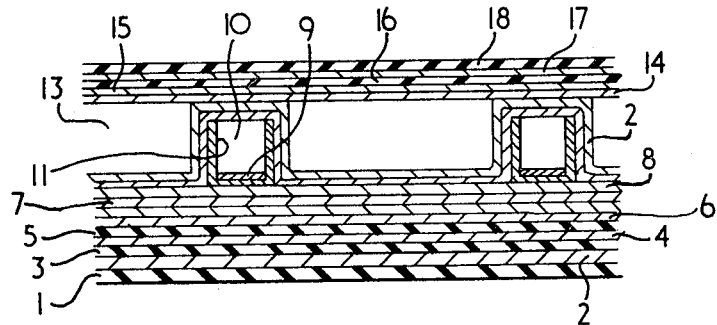
Figure 3:
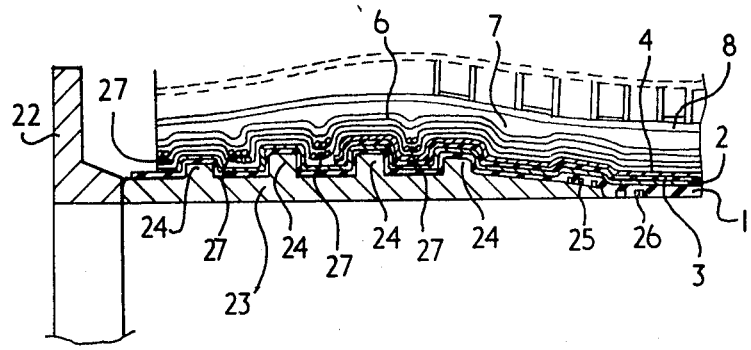
Figure 2:
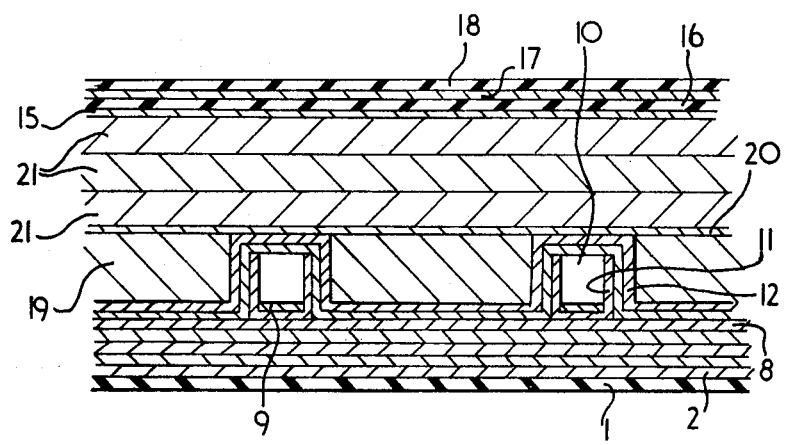

Some embodiments of the invention will now be described, by way of example only, in conjunction with the accompanying drawings in which:

FIG. 1 shows a section of a hose wall of non-floating construction;
FIG. 2 shows a section of a hose wall of self-floating construction;
FIG. 3 shows in section the attachment of the end of a hose to an end fitting.

FIG. 1 shows the structure of a 24″ nominal bore hose of the non-floating type. The hose is built on a steel mandrel from which it is removed after final vulcanisation and trimming.

A first layer of uncured rubber is wrapped around the mandrel to form a hose lining layer 1. A first rubberised fabric layer 2 of textile fabric is applied over the hose lining layer followed by a second hose lining layer 3 of uncured rubber and a second rubberised fabric breaker layer 4. These layers together comprise the lining of the hose.

A filler layer 5 of uncured rubber material is laid over the lining and then several layers 6, 7 of textile fabric reinforcement are applied. These layers of fabric are pre-coated with uncured rubber so that the layers bond together to give a homogeneous region of reinforcement.

A third fabric breaker layer 8 is applied to form a base for ring reinforcements 11 which each comprise two half-ring sections of U-shaped cross-section aluminium alloy. Each pair of sections is positioned around the hose to form a continuous annular U-shaped channel and a thin steel strip retaining strip 9 is placed in the base of the channel and coupled at its join to hold the sections in position. Reinforcement rings 11 are placed at one inch intervals along the length of the hose to provide both strength and flexibility without the assembly being as heavy as hitherto.

The annular channel of each ring 11 is then filled by winding with pre-impregnated resin/glass fibre rovings 10. This filling 10 is of 60 ends x 152 TEX glass fibre rovings impregnated with a polyester resin compound to which has been added Magnesium Oxide to produce a dry, handleable pre-impregnated material. A catalyst, Tertiary Butyl Cumyl Peroxide is used which causes the resin to cure only at temperatures above about 100° C. The rings act as moulds for the resin/glass fibre material.

A feature of the filling material is that the reinforcement strands are made of a radius of curvature substantially the same as the radius of the channel to be filled and thus, when wound, the fibres form a ring of material of maximum strength and rigidity without any fibres having buckled during winding.

Two fabric breaker plies 12 are applied over the rings 11 and the spaces between the rings are filled with microcellular sponge.

The outer cover comprises a fabric breaker layer 14, a cord or fabric holding ply 15, a sub cover 16 of uncured rubber, another fabric breaker layer 17 and a final covering layer 18.

The assembly is then wrapped tightly with a wet nylon tape to compact the assembly and heated in a steam oven simultaneously to vulcanise the uncured rubber and cure the resin of the resin/fibreglass layers. The nylon tape is removed and the hose is finally trimmed and tested.

The resultant hose contains an integral reinforcement of resin/glass fibre rings. The rings give increased resistance to burst and/or crushing without making the hose as inflexible as normal helical steel reinforcing windings. The material of the rings is non-corrosive and fully compatable with the elastomeric material in the hose structure. The construction is simple and involves no expensive machinery as the annular channels are fitted in parts.

The hose shown in FIG. 2 is basically the same as that described above but is in fact a self-floating hose construction. After filling the alloy rings 11 and applying the breaker plies 12 the spaces between the rings are filled with microcellular sponge 19. A fabric breaker layer 20 is then applied and three layers 21 of microcellular sponge. The number of layers is determined by the degree of buoyancy required in the finished hose. The outer covering layers 15, 16, 17 and 18 are then applied as in the first embodiment and the hose cured as before.

The finished hose can be used in short lengths in conjunction with rigid sections of metal pipe in which case the hose provides flexible links between the rigid sections. Such pipelines are sometimes used for dredging and additional buoyancy floats are usually attached to the rigid sections. This type of construction is preferable to the normal ball socket joints as the assembly is more flexible, lighter and more easily made self-floating. The increased flexibility allows dredging in larger waves than the ball socket type hoses.

When used for continuous flexible pipelines the hose lengths are provided with end fittings, often of the flanged type, which allow the assembly of long pipelines from many sections of hose.

The method of attaching the end fittings is shown in FIG. 3. An end fitting comprises a flange 22 butt welded to a cylindrical nipple 23. The nipple has steel rings 24 welded to its outer diameter to provide a purchase for the hose and a tapered outer diameter 25 at the end to give a smooth overlap for the hose materials.

In manufacture of a hose an end fitting is positioned at either end of the assembly mandrel and a strip of fabric 26 is wrapped over the junction of the nipple and mandrel. The layers of the hose lining 1, 2, 3, 4 are then applied as in the previous construction to overlap and nest between the rings 24 on the nipple 23. The layers of textile fibre reinforcement 6, 7 as in the previous construction also overlap the rings 24 but, after applying each layer, steel wire 27 is wound around the assembly to force the reinforcement and underlying layers into the gaps between the rings. The assembly after the reinforcement layers are applied is the same as in the earlier examples, but this is not illustrated in detail.

Various modifications can be made to the above specific examples. The various breaker plies and reinforcement plies can be of such material as will give the desired results—being of textile, natural or synthetic; or of metal cords, for example, including fine wire metal cords. The textile or metal cords may be applied in single cord length or in the form of multiple parallel cord strip in the form of a woven fabric or in other forms. The resin used to impregnate the glass fibre may be of polyester resin, or alternatively an epoxy resin may be used.

Furthermore, the reinforcement rings may be built up without annular channels or the annular channels may each be in more than two sections. In the assembly of short lengths of hose the channel sections may be formed into continuous rings and positioned on the hose by sliding them on axially. The channel sections may also be of materials other than aluminium. The multiple section annular channels may be temporarily fastened by wire, cord or tapes as long as the temporary fastener does not take up any substantial volume of the channel.

The reinforcement resin/glass fibre material may be in the form of a tape, a cord, or a thick band. In either case sufficient windings are made to fill the annular channel with material.

Having now described our invention what we claim is:

1. Flexible hose comprising an inner lining of elastomeric material, reinforcing layers of layers of wire cord, a plurality of spaced-apart rings of cured resinous material containing reinforcement filaments, a plurality of channel section members containing each of said spaced-apart rings, rings of elastomeric filler material between the spaced-apart rings, an outer breaker layer and an outer covering layer.

2. Flexible hose according to claim 1 wherein the elastomer filler is a cellular material.

3. Flexible hose as in claim 2 wherein at least one layer of cellular material is provided over the spaced apart rings and under the outer covering layer to provide buoyancy for the hose.

4. Flexible hose as in claim 1 wherein each ring of resinous material comprises a winding of the material in the form of cord or tape.

5. Flexible hose as in claim 1 wherein the channel member comprises at least two interconnected sections.

No references cited.

HERBERT F. ROSS, Primary Examiner

U.S. Cl. X.R.

138—124, 129, 131, 109